(12) United States Patent
Ooiso et al.

(10) Patent No.: US 8,961,360 B2
(45) Date of Patent: Feb. 24, 2015

(54) SUPPORTING STRUCTURE FOR PLANETARY GEAR MECHANISM

(75) Inventors: Keiichi Ooiso, Wako (JP); Jun Aoki, Wako (JP); Yoshio Akiba, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 143 days.

(21) Appl. No.: 13/602,201

(22) Filed: Sep. 3, 2012

(65) Prior Publication Data

US 2013/0059694 A1 Mar. 7, 2013

(30) Foreign Application Priority Data

Sep. 6, 2011 (JP) .................................. 2011-194287

(51) Int. Cl.
*F16H 57/08* (2006.01)
*B60K 1/02* (2006.01)
*B60K 1/00* (2006.01)

(52) U.S. Cl.
CPC ... *B60K 1/02* (2013.01); *B60K 1/00* (2013.01); *B60K 2001/001* (2013.01)
USPC ...................................................... 475/331

(58) Field of Classification Search
USPC ...................................................... 475/331
See application file for complete search history.

(56) References Cited

U.S. PATENT DOCUMENTS

2007/0007817 A1* 1/2007 Nonaga et al. ................. 303/155
2011/0203898 A1* 8/2011 Harashima et al. ........ 192/219.4

FOREIGN PATENT DOCUMENTS

| JP | 2001-330111 | 11/2001 |
| JP | 2008-037355 | 2/2008 |
| JP | 2010-235051 | 10/2010 |

OTHER PUBLICATIONS

Japanese Office Action for corresponding JP Application No. 2011-194287, Jul. 10, 2013.
Japanese Office Action for corresponding JP Application No. 2011-194287, Feb. 12, 2014.

* cited by examiner

*Primary Examiner* — Tisha Lewis
(74) *Attorney, Agent, or Firm* — Mori & Ward, LLP (57) ABSTRACT

A supporting structure for a planetary gear mechanism includes a planetary carrier, a first bearing, and a second bearing. The planetary carrier includes a rotation shaft and an arm portion. The rotation shaft extends in an axis direction to support a planetary gear of the planetary gear mechanism to be rotatable about a rotational axis along the axis direction. The rotation shaft includes a first end and a second end opposite to the first end along the rotational axis. The first and second bearings are disposed on a first side of the planetary gear in the axis direction. The planetary carrier is radially supported by the first and second bearings without a bearing which radially supports the planetary carrier in the casing and which is provided on a second side of the planetary gear in the axis direction.

14 Claims, 7 Drawing Sheets

BACKGROUND ART

FIG. 7

BACKGROUND ART

US 8,961,360 B2

SUPPORTING STRUCTURE FOR PLANETARY GEAR MECHANISM

CROSS-REFERENCE TO RELATED APPLICATIONS

The present application claims priority under 35 U.S.C. §119 to Japanese Patent Application No. 2011-194287, filed Sep. 6, 2011, entitled "Supporting Structure for Planetary Gear Mechanism." The contents of this application are incorporated herein by reference in their entirety.

BACKGROUND OF THE INVENTION

1. Field of the Invention

The present disclosure relates to a supporting structure for a planetary gear mechanism.

2. Discussion of the Background

Figure 6:
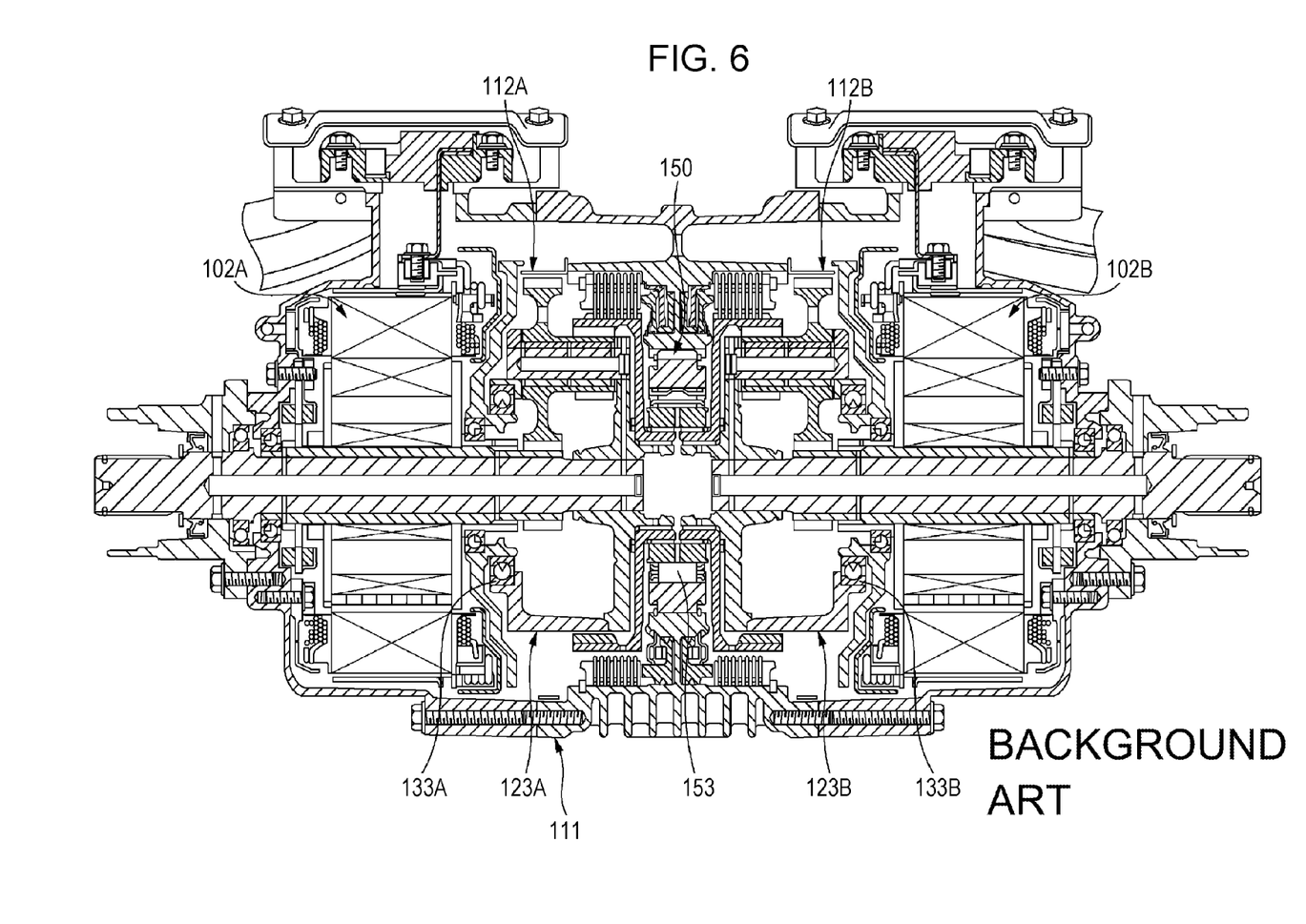
FIG. 6 is a vertical cross-sectional view of the drive device for a vehicle, which is described in Japanese Unexamined Patent Application Publication No. 2010-235051.

As illustrated in FIG. 6, Japanese Unexamined Patent Application Publication No. 2010-235051 discloses a drive device for a vehicle, in which a planetary gear mechanism 112A is provided as a speed reducer along the power transmission path between a left rear wheel (not shown) and an electric motor 102A which drives the left rear wheel, and a planetary gear mechanism 112B is provided as a speed change gear along the power transmission path between a right rear wheel (not shown) and an electric motor 102B which drives the right rear wheel.

Figure 7:
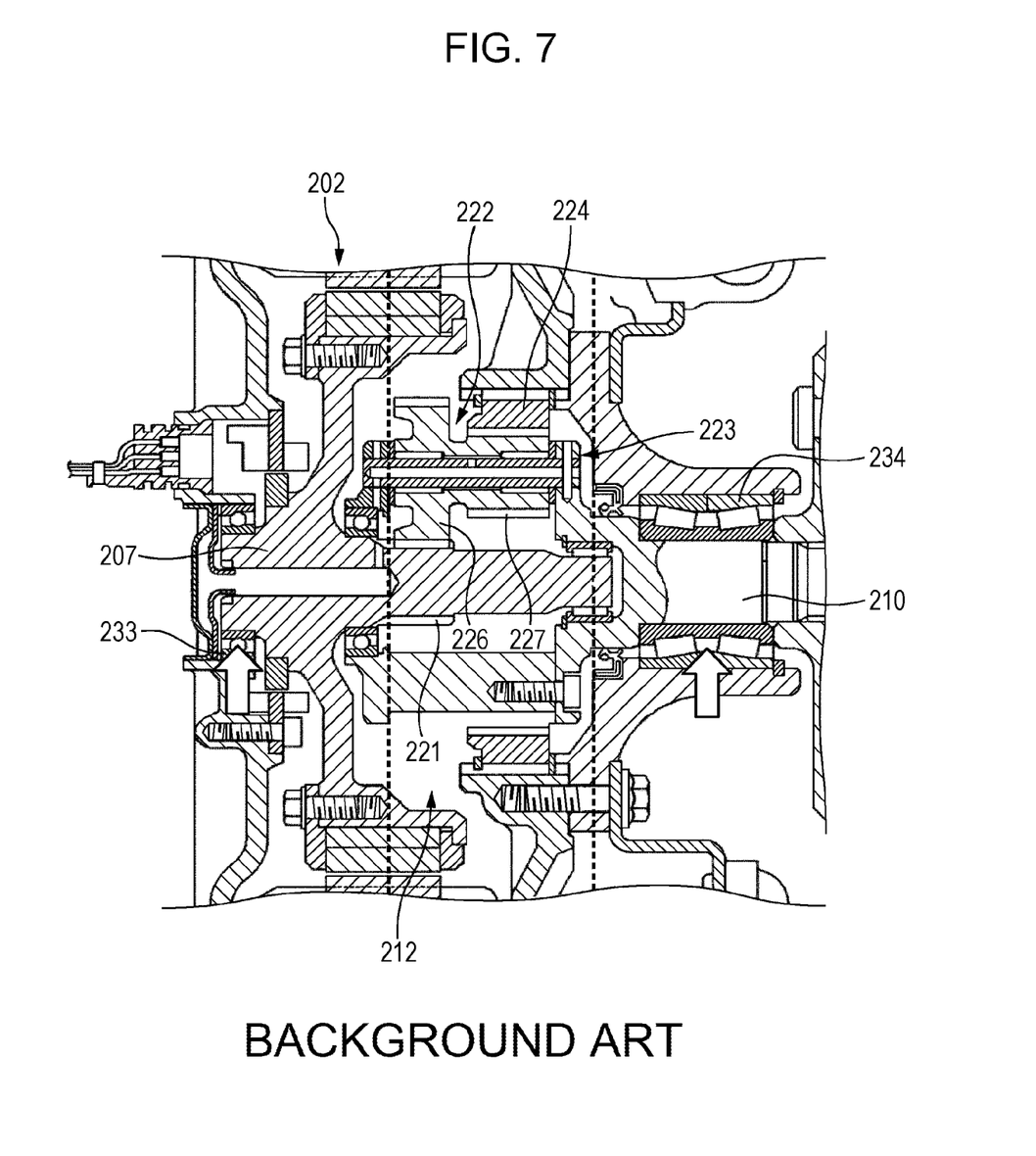
FIG. 7 is a vertical cross-sectional view of the drive device for a vehicle, which is described in Japanese Unexamined Patent Application Publication No. 2008-037355.

As illustrated in FIG. 7, Japanese Unexamined Patent Application Publication No. 2008-037355 describes a mechanism in which a planetary gear mechanism 212 is provided as a speed reducer along the power transmission path between an electric motor 202 and wheels (not shown), and thus the power from the electric motor 202 is transmitted from a rotor rotation shaft 207 and a sun gear 221 to a major-diameter pinion 226 engaged with the sun gear 221, and a minor-diameter pinion 227 integral with the major-diameter pinion 226. The minor-diameter pinion 227 then rolls along the inner circumference of a fixed ring gear 224 so that reduced rotation can be transmitted from the planetary carrier 223 to the wheels via an output shaft 210.

In the planetary gear mechanisms 112A, 112B described in Japanese Unexamined Patent Application Publication No. 2010-235051, one ends of planetary carriers 123A, 123B are respectively supported on a case 111 by bearings 133A, 133B, however a sprag 153 of a one-way clutch 150 is disposed at the other ends, and thus the other ends are not supported on the case 111.

In the planetary gear mechanism 212 described in Japanese Unexamined Patent Application Publication No. 2008-037355, one end of the planetary carrier 223 is supported by a double row bearing 234, and the other end is supported by another rotor bearing 233 via the rotor rotation shaft 207.

SUMMARY OF THE INVENTION

According to one aspect of the present invention, a supporting structure for a planetary gear mechanism includes a planetary carrier, a first bearing, and a second bearing. The planetary carrier includes a rotation shaft and an arm portion. The rotation shaft extends in an axis direction to support a planetary gear of the planetary gear mechanism to be rotatable about a rotational axis along the axis direction. The rotation shaft includes a first end and a second end opposite to the first end along the rotational axis. The arm portion radially extends and holds the rotation shaft. The first bearing radially supports the first end of the rotation shaft. The second bearing radially supports the second end of the rotation shaft. The first and second bearings are disposed on a first side of the planetary gear in the axis direction and radially support the planetary carrier to be rotatable in a casing in which the planetary gear mechanism is disposed. The planetary carrier is radially supported by the first and second bearings without a bearing which radially supports the planetary carrier in the casing and which is provided on a second side of the planetary gear in the axis direction. The second side is opposite to the first side with respect to the planetary gear in the axis direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
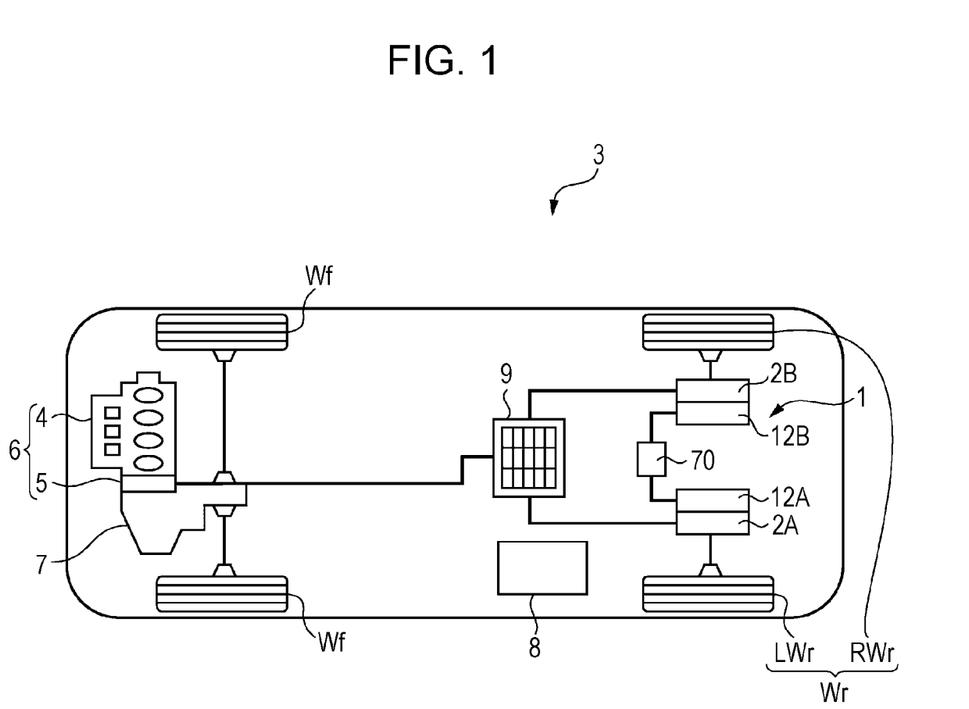
FIG. 1 is a block diagram illustrating the schematic configuration of a hybrid vehicle which is an embodiment of a vehicle that can mount a supporting structure for a planetary gear mechanism according to the present disclosure.

A drive device for a vehicle, provided with a supporting structure for a planetary gear mechanism according to the present disclosure is used, for example, in a vehicle with a drive system as illustrated in FIG. 1. In the following description, a case is described where the drive device for a vehicle is used as a rear-wheel drive device. However, the drive device for a vehicle may be used as a front-wheel drive device. A vehicle 3 illustrated in FIG. 1 is a hybrid vehicle which has a drive device 6 (hereinafter referred to as a front-wheel drive device) at the front of the vehicle, the drive device 6 being formed by connecting an internal combustion engine 4 and an electric motor 5 to each other in series. The power of the front-wheel drive device 6 is transmitted to front wheels Wf via a transmission 7, while the power of a drive device 1 (hereinafter referred to as a rear-wheel drive device) provided in the rear of the vehicle separately from the front-wheel drive device 6 is transmitted to rear wheels Wr (RWr, LWr). The electric motor 5 of the front-wheel drive device 6, and first and second electric motors 2A, 2B of the rear-wheel drive device 1 on the rear wheel Wr side are connected to a battery 9 so that power can be supplied from the battery 9 and regenerated energy can be stored in the battery 9. A reference symbol 8 in FIG. 1 indicates a control device for controlling the entire vehicle.

Figure 2:
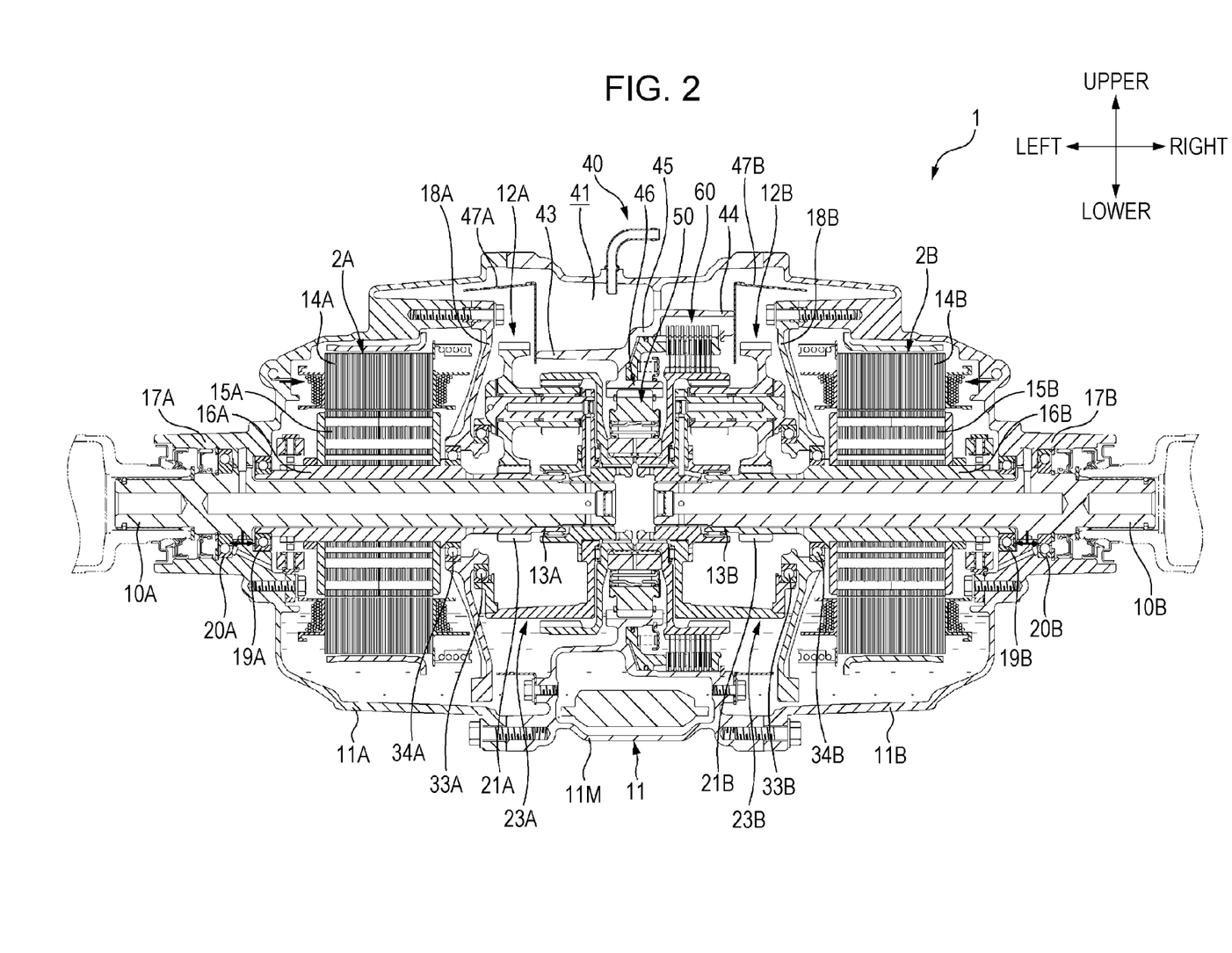
FIG. 2 is a vertical cross-sectional view of a rear-wheel drive device.
Figure 3:
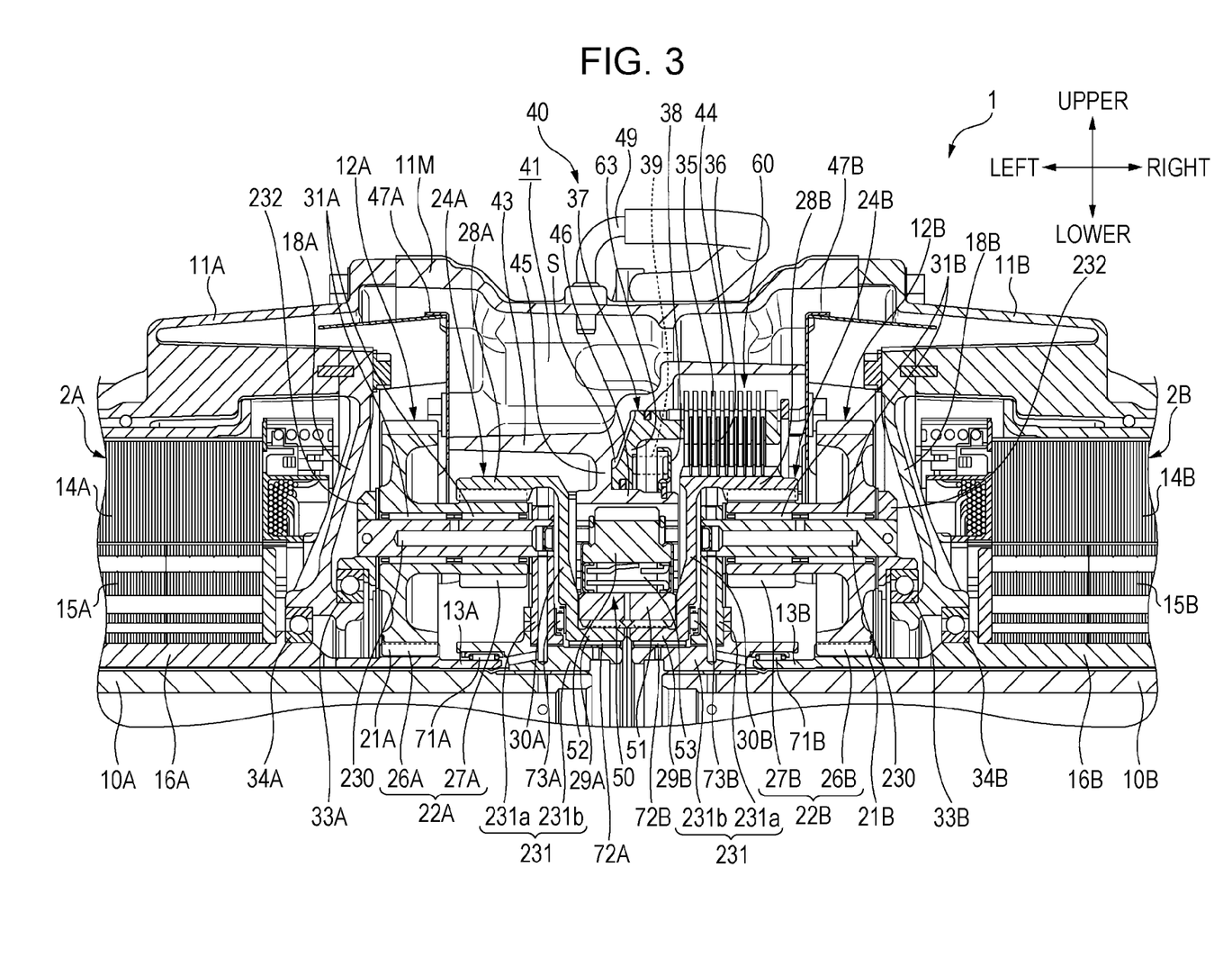
FIG. 3 is an enlarged cross-sectional view of the upper part of the rear-wheel drive device illustrated in FIG. 2.

First, a drive device for a vehicle in an embodiment, which is provided with the supporting structure for a planetary gear mechanism according to the present disclosure is described with reference to FIGS. 2 and 3. FIG. 2 is a vertical cross-sectional view of the entire rear-wheel drive device 1, and FIG. 3 is an enlarged cross-sectional view of the upper part of FIG. 2. In FIGS. 2 and 3, a reference symbol 11 indicates the case of the rear-wheel drive device 1, and the case 11 (casing) includes a central case 11M disposed substantially at the center in the vehicle width direction; and lateral cases 11A, 11B that are respectively disposed on the left and right of the central case 11M so that the central case 11M is interposed between the lateral cases 11A, 11B. The entire case 11 is formed in a substantially cylindrical shape. Inside the case 11, axles 10A, 10B for the rear wheels Wr, first and second electric motors 2A, 2B for driving the axle, and first and second planetary gear speed reducers 12A, 12B for reducing the drive rotation of the first and second electric motors 2A, 2B are arranged on the same axis. The axle 10A, the first electric motor 2A, and the first planetary gear speed reducer 12A control the drive of the left rear wheel LWr, while the axle 10B, the second electric motor 2B, and the second planetary gear speed reducer 12B control the drive of the right rear wheel RWr. The axle 10A, the first electric motor 2A, the first planetary gear speed reducer 12A, and the axle 10B, the second electric motor 2B, the second planetary gear speed reducer 12B are arranged symmetrically about the center of the vehicle width in the case 11. The left rear wheel LWr and the first planetary gear speed reducer 12A are located on opposite sides of the first electric motor 2A, and the right rear wheel RWr and the second planetary gear speed reducer 12B are located on opposite sides of the second electric motor 2B.

Partition walls 18A, 18B extending radially inwardly are disposed on respective sides of the lateral cases 11A, 11B, which face the central case 11M, and the first and second electric motors 2A, 2B are disposed between the lateral cases 11A, 11B and the partition walls 18A, 18B, respectively. The first and second planetary gear speed reducers 12A, 12B are disposed in the space surrounded by the central case 11M and the partition walls 18A, 18B. The arrows in FIGS. 2 and 3 indicate positional relationships in a state where the rear-wheel drive device 1 is mounted in the vehicle.

The rear-wheel drive device 1 is provided with a breather device 40 which communicates the inside and the outside of the case 11 so that the internal air can escape via a breather chamber 41 in order to prevent the internal air from becoming excessively high in temperature and pressure. The breather chamber 41 is disposed vertically above the case 11, and is composed of the space that is formed by the outer wall of the central case 11M, a first cylindrical wall 43 which extends toward the left lateral case 11A in a substantially horizontal direction in the central case 11M, a second cylindrical wall 44 which extends toward the right lateral case 11B in a substantially horizontal direction in the central case 11M, a right-and-left dividing wall 45 which connects the inner ends of the first and second cylindrical walls 43, 44, a baffle plate 47A which is installed so as to be contact with the distal end of the left lateral case 11A of the first cylindrical wall 43, and a baffle plate 47B which is installed so as to be contact with the distal end of the right lateral case 11B of the second cylindrical wall 44.

The first and second cylindrical walls 43, 44, and the right-and-left dividing wall 45 which constitute the lower surface of the breather chamber 41 are formed so that the first cylindrical wall 43 is located radially inward of the second cylindrical wall 44, and the right-and-left dividing wall 45 extends from the inner end of the second cylindrical wall 44 to the inner end of the first cylindrical wall 43 while bending to reduce the radial dimension of the right-and-left dividing wall 45. The right-and-left dividing wall 45 further extends and reaches a third cylindrical wall 46 which extends in a substantially horizontal direction. The third cylindrical wall 46 is located at substantially the center of both outer ends of the first cylindrical wall 43 and the second cylindrical wall 44.

In the central case 11M, the baffle plate 47A is fixed so as to partition the space between the first cylindrical wall 43 and the outer wall of the central case 11M in order to separate the first planetary gear speed reducer 12A, and the baffle plate 47B is fixed so as to partition the space between the second cylindrical wall 44 and the outer wall of the central case 11M in order to separate the second planetary gear speed reducer 12B. In addition, in the central case 11M, an external communication path 49, which allows communication between the breather chamber 41 and the outside, is connected to the upper surface of the breather chamber 41 in the vertical direction.

In the first and second electric motors 2A, 2B, stators 14A, 14B are respectively fixed to the lateral cases 11A, 11B, and ring-shaped rotors 15A, 15B are rotatably disposed within the inner circumference of the stators 14A, 14B. At the inner circumference of the rotors 15A, 15B, cylindrical shafts 16A, 16B, which respectively surround the outer circumference of the axles 10A, 10B, are secured thereto, and are radially supported via bearings 19A, 19B and bearings 34A, 34B on end walls 17A, 17B and the partition walls 18A, 18B of the lateral cases 11A, 11B, respectively, so that the cylindrical shafts 16A, 16B are rotatable relative to the axles 10A, 10B on the same axis. Inward of the cylindrical shafts 16A, 16B in the shaft direction, the below-described sun gears 21A, 21B of the first and second planetary gear speed reducers 12A, 12B are formed integrally with the cylindrical shafts 16A, 16B. Extending portions 13A, 13B are formed further inward of the sun gears 21A, 21B in the shaft direction. Outward, in the shaft direction, of the bearings 19A, 19B which support the cylindrical shafts 16A, 16B, the end walls 17A, 17B of the lateral cases 11A, 11B are respectively provided with bearings 20A, 20B which radially support the axles 10A, 10B. Inward of the axles 10A, 10B in the shaft direction, bearings which support the axles 10A, 10B are not provided.

The first and second electric motors 2A, 2B which include the stators 14A, 14B and the rotors 15A, 15B have the same radius, and are disposed with mirror symmetry. The axle 10A and the cylindrical shaft 16A pass through the first electric motor 2A, and extend from both ends of the first electric motor 2A, and the axle 10B and the cylindrical shaft 16B also pass through the second electric motor 2B, and extend from both ends of the second electric motor 2B.

The first and second planetary gear speed reducers 12A, 12B respectively include the sun gears 21A, 21B, planetary carriers 23A, 23B, and ring gears 24A, 24B on the same axis, the planetary carriers 23A, 23B rotatably supporting a plurality of planetary gears 22A, 22B which are engaged with the sun gears 21A, 21B, and the ring gears 24A, 24B being engaged with the outer circumferences of the planetary gears 22A, 22B, respectively, whereby the driving forces of the first and second electric motors 2A, 2B are inputted to the sun gears 21A, 21B, respectively, and reduced driving forces are outputted to the axles 10A, 10B via the planetary carriers 23A, 23B. The axis of the first and second planetary gear speed reducers 12A, 12B is the same as the axis of the axles 10A, 10B and the cylindrical shafts 16A, 16B, thus the axis direction matches the shaft direction.

The sun gears 21A, 21B are formed integrally with the cylindrical shafts 16A, 16B. The planetary gears 22A, 22B are each twin pinion gears having first major-diameter pinions 26A, 26B which are directly engaged with the sun gears 21A, 21B, and second pinions 27A, 27B having a diameter smaller than that of the first pinions 26A, 26B. The first pinions 26A, 26B and the second pinions 27A, 27B are integrally formed on the same axis with an offset in the axis direction. The second pinions 27A, 27B are disposed at positions so as to overlap in the axis direction with the extending portions 13A, 13B of the cylindrical shafts 16A, 16B, respectively. The planetary gears 22A, 22B are supported by pinion shafts 230 of the planetary carriers 23A, 23B via needle bearings 31A, 31B, respectively.

In the planetary carriers 23A, 23B, the inner ends of the pinion shafts 230 which extend in the axis direction are retained by inner arm portions 231. The inner arm portions 231 include carrier plates 231a which extend radially; and carrier bases 231b which are mounted integrally with the axles 10A, 10B radially inward of the carrier plates 231a, and are spline-fitted to be rotatable integrally with the axles 10A, 10B. The carrier bases 231b extend toward the extending portions 13A, 13B so as to overlap in the axis direction with the extending portions 13A, 13B of the cylindrical shafts 16A, 16B, and are supported by the extending portions 13A, 13B via bearings 71A, 71B, respectively. In addition, the carrier bases 231b also extend toward the opposite side of the extending portions 13A, 13B so as to overlap in the axis direction with the below-described minor-diameter portions 29A, 29B of the ring gears 24A, 24B.

On the other hand, the outer ends of the pinion shafts 230 are radially supported on the partition walls 18A, 18B by outer arm portions 232 via bearings 33A, 33B, respectively.

The ring gears 24A, 24B include gears portions 28A, 28B, the inner circumferential surfaces of which are engaged with the minor-diameter second pinions 27A, 27B; minor-diameter gear portions 29A, 29B which each have a diameter smaller than that of the gears portions 28A, 28B, and are disposed to face each other at a position in the middle of the case 11; and coupling portions 30A, 30B which respectively radially couple the axially inner ends of the gears portions 28A, 28B to the axially outer ends of the minor-diameter gear portions 29A, 29B.

The gear portions 28A, 28B are axially opposed to each other with a third cylindrical wall 46 therebetween, which is formed at the inner diameter end of the right-and-left dividing wall 45 of the central case 11M. The outer circumferential surfaces of the minor-diameter gear portions 29A, 29B are each spline-fitted to an inner race 51 of the below-described one-way clutch 50, and the ring gears 24A, 24B are connected to the inner race 51 of the one-way clutch 50 so as to rotate integrally therewith. The inner circumferential surfaces of the minor-diameter gear portions 29A, 29B are rotatably supported by the carrier bases 231b relative to bearings 72A, 72B. Bearings 73A, 73B are also disposed between the coupling portions 30A, 30B and the carrier plates 231a.

A hydraulic brake 60 which serves as a braking device for the ring gear 24B is disposed between the second cylindrical wall 44 of the central case 11M which constitutes part of the case 11, and the gear portion 28B of the ring gear 24B on the side of the second planetary gear speed reducer 12B so that the hydraulic brake 60 radially overlaps with the first pinion 26B, and axially overlaps with the second pinion 27B. In the hydraulic brake 60, a plurality of fixed plates 35 which are spline-fitted to the inner circumferential surface of the second cylindrical wall 44, and a plurality of rotary plates 36 which are spline-fitted to the outer circumferential surface of the gear portion 28B of the ring gear 24B are alternately disposed in the axis direction so that an engaging or releasing operation is performed on the plates 35, 36 by a ring-shaped piston 37. The piston 37 is retractably housed in a ring-shaped cylinder chamber which is formed between the right-and-left dividing wall 45 of the central case 11M and the third cylindrical wall 46, and is further constantly urged by an elastic member 39 in a direction such that the fixed plates 35 and the rotary plates 36 are released, the elastic member 39 being supported by a receiving member 38 which is provided on the outer circumferential surface of the third cylindrical wall 46.

More particularly, between the right-and-left dividing wall 45 and the piston 37, there is formed an operating chamber S into which oil is directly introduced, and when the pressure of the oil introduced into the operating chamber S exceeds the urging force of the elastic member 39, the piston 37 moves forward (moves to the right) so that the fixed plates 35 and the rotary plates 36 are pressed against each other and engaged with each other. On the other hand, when the urging force of the elastic member 39 exceeds the pressure of the oil introduced into the operating chamber S, the piston 37 moves backward (moves to the left) so that the fixed plates 35 and the rotary plates 36 are separated from each other and released from each other. The hydraulic brake 60 is connected to an electric oil pump 70 (see FIG. 1).

In the case of the hydraulic brake 60, the fixed plates 35 are supported by the second cylindrical wall 44 extending from the right-and-left dividing wall 45 of the central case 11M which constitutes part of the case 11, while the rotary plates 36 are supported by the gear portion 28B of the ring gear 24B. Therefore, when both plates 35, 36 are pressed against each other by the piston 37, frictional engagement between the plates 35, 36 causes braking force to be applied to the ring gear 24B, which is then fixed in place. In the above state, when the engagement caused by the piston 37 is released, the ring gear 24B is allowed to rotate freely. As described above, the ring gears 24A, 24B are connected to each other, and thus engagement of the hydraulic brake 60 also causes braking force to be applied to the ring gear 24A, and release of the hydraulic brake 60 also allows the ring gear 24A to rotate freely.

A space is also ensured between the coupling portions 30A, 30B of the ring gears 24A, 24B which are axially opposed to each other, and in the space, the one-way clutch 50 is disposed which allows power to be transmitted to the ring gears 24A, 24B only in one direction, but prevents power transmission in the other direction. The one-way clutch 50 is a clutch in which a great number of sprags 53 are interposed between the inner race 51 and an outer race 52, and has a configuration such that the inner race 51 rotates integrally with the minor-diameter gear portions 29A, 29B of the ring gears 24A, 24B by spline fitting. The outer race 52 is positioned and whirl-stopped by the third cylindrical wall 46.

The one-way clutch 50 is configured to engage and lock rotation of the ring gears 24A, 24B when the vehicle 3 moves forward under the power of the first and second electric motors 2A, 2B. More specifically, when forward-direction (rotation direction as the vehicle 3 moves forward) rotational power of the first and second electric motors 2A, 2B is inputted to the wheels Wr, the one-way clutch 50 is set in an engaged state, while when reverse-direction rotational power of the first and second electric motors 2A, 2B is inputted to the wheels Wr, the one-way clutch 50 is set in a disengaged state. When forward-direction rotational power of the wheels Wr is inputted to the first and second electric motors 2A, 2B, the one-way clutch 50 is set in a disengaged state, while when reverse-direction rotational power of the wheels Wr is inputted to the first and second electric motors 2A, 2B, the one-way clutch 50 is set in an engaged state.

Thus, the rear-wheel drive device 1 in the present embodiment, the one-way clutch 50 and the hydraulic brake 60 are provided side by side along the power transmission path between the first and second electric motors 2A, 2B, and the wheels Wr. The hydraulic brake 60 is controlled in a released or engaged state by the pressure of the oil supplied from the oil pump 70 in accordance with a running state of the vehicle and an engaged/disengaged state of the one-way clutch 50. For example, when the vehicle 3 moves forward by driving power of at least the first and second electric motors 2A, 2B (rear-wheel drive or four-wheel drive) at the time of vehicle start, the one-way clutch 50 engages and is set in a state which allows power transmission, and thus the hydraulic brake 60 is typically controlled in a released state. Alternatively, when the vehicle 3 moves forward by driving power of the internal combustion engine 4 and/or the electric motor 5 (front-wheel drive), and a limit vehicle speed is exceeded, the one-way clutch 50 is disengaged and the hydraulic brake is further controlled in a released state, and thus excessive rotation of the first and second electric motors 2A, 2B is prevented. On the other hand, when the vehicle 3 moves backward or power regeneration is performed, the one-way clutch 50 is disengaged, and thus by controlling the hydraulic brake 60 in an engaged state, reverse-direction rotational power of the first and second electric motors 2A, 2B is outputted to the wheels Wr, or forward-direction rotational power of the wheels Wr is inputted to the first and second electric motors 2A, 2B.

A supporting structure for the first and second planetary gear speed reducers 12A, 12B in the rear-wheel drive device 1 configured in the above manner will be described in detail in the following. Because the cylindrical shafts 16A, 16B, which are formed integrally with the sun gears 21A, 21B, are radially supported via the bearings 19A, 19B and the bearings 34A, 34B on the end walls 17A, 17B and the partition walls 18A, 18B which are located on both sides of the electric motors 2A, 2B, respectively, the sun gears 21A, 21B are radially supported via the bearings 19A, 19B and the bearings 34A, 34B on the end walls 17A, 17B and the partition walls 18A, 18B, respectively. In the ring gears 24A, 24B, the inner circumferential surfaces of the minor-diameter gear portions 29A, 29B are radially rotatably supported relative to the carrier bases 231b via the bearings 72A, 72B.

In the planetary carriers 23A, 23B which support the ring gears 24A, 24B via the carrier bases 231b, the axially outer ends of the pinion shafts 230 are radially supported on the partition walls 18A, 18B by the outer arm portions 232 via the bearings 33A, 33B, respectively, and the axially inner ends of the pinion shafts 230 (the carrier bases 231b) are radially supported via the bearings 71A, 71B on the extending portions 13A, 13B of the cylindrical shafts 16A, 16B which are supported by the end walls 17A, 17B and the partition walls 18A, 18B via the bearings 19A, 19B and the bearings 34A, 34B, respectively. That is to say, in the planetary carriers 23A, 23B, both sides of the pinion shafts 230 are radially supported on the case 11 via the bearings 33A, 33B, the bearings 19A, 19B, and the bearings 34A, 34B.

All of the bearings 33A, 33B, the bearings 19A, 19B, and the bearings 34A, 34B are disposed axially outward of the planetary gears 22A, 22B, and a bearing which supports the planetary carriers 23A, 23B from the case 11 is not provided axially inward of the planetary gears 22A, 22B. Although the bearings 19A, 19B and the bearings 34A, 34B are provided as the bearings for supporting the axially inner ends of the planetary carriers 23A, 23B, either one pair of the bearings may be provided. In this manner, at least two bearings which support the axially outer end and inner end of the planetary carriers 23A, 23B are arranged together axially outward of the planetary gears 22A, 22B, and thus a space can be ensured axially inward of the planetary gears 22A, 22B.

In the rear-wheel drive device 1 according to the above embodiment, the one-way clutch 50 is disposed between the two planetary gear mechanisms, i.e., axially inward of the first and second planetary gear speed reducers 12A, 12B. Arrangement of the one-way clutch 50 in a space formed inwardly of the first and second planetary gear speed reducers 12A, 12B reduces the radial size of the rear-wheel drive device 1.

Figure 4:
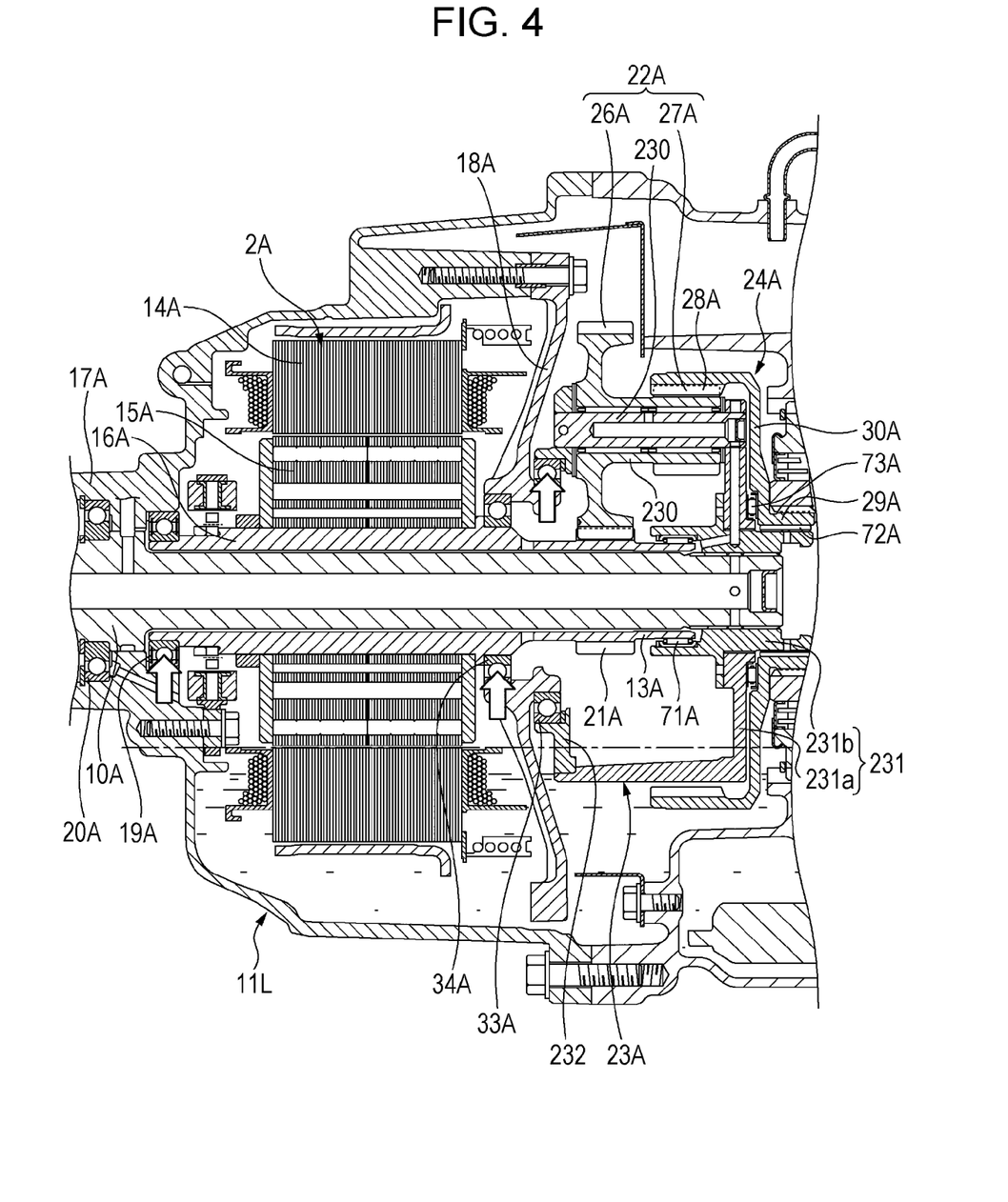
FIG. 4 is an enlarged cross-sectional view of the left part of the rear-wheel drive device illustrated in FIG. 2 when a load is imposed on a planetary carrier in the lower vertical direction.
Figure 5:
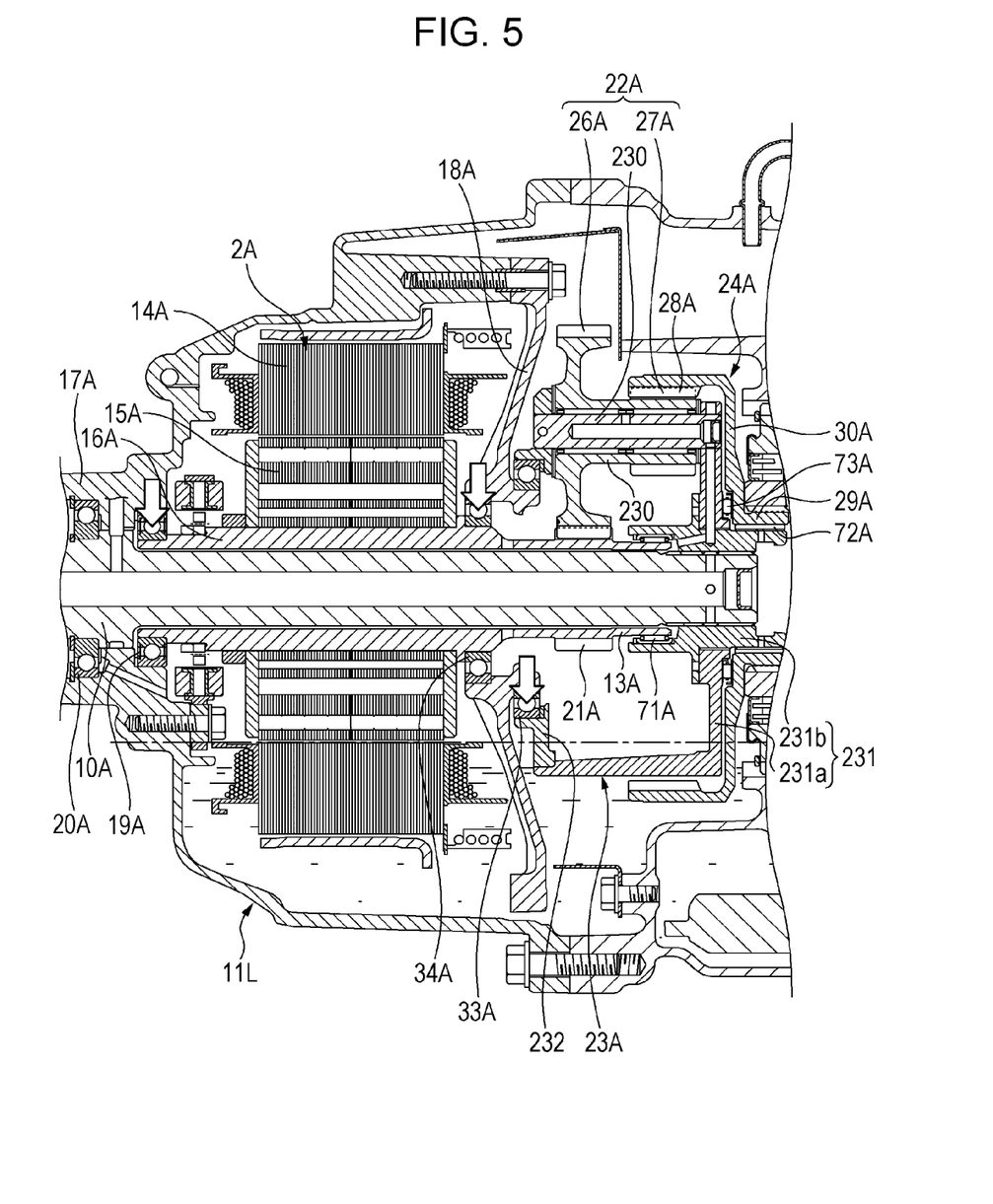
FIG. 5 is an enlarged cross-sectional view of the left part of the rear-wheel drive device illustrated in FIG. 2 when a load is imposed on the planetary carrier in the upper vertical direction.

FIG. 4 is an enlarged cross-sectional view of the left part of the rear-wheel drive device illustrated in FIG. 2 when a load is imposed on a planetary carrier in the lower vertical direction; and FIG. 5 is an enlarged cross-sectional view of the left part of the rear-wheel drive device illustrated in FIG. 2 when a load is imposed on the planetary carrier in the upper vertical direction. As illustrated in FIGS. 4 and 5, when a load is imposed on the planetary carrier in the lower or upper vertical direction, as indicated by an outline arrow in FIGS. 4 and 5, the outer ends of the pinion shafts 230 are radially supported on the partition walls 18A, 18B via the bearings 33A, 33B, the inner ends of the pinion shafts 230 are radially supported on the partition walls 18A, 18B via the bearings 34A, 34B, and are radially supported on the end walls 17A, 17B via the bearings 19A, 19B, respectively. Therefore, according to the present embodiment, in the planetary carriers 23A, 23B, both ends of pinion shafts 230 are radially supported on the case 11, thus even when a load is imposed, axial displacement is prevented.

As described above, according to the present embodiment, the planetary carriers 23A, 23B are radially supported on the case 11 by the bearings 33A, 33B which radially support the axially outer ends of the pinion shafts 230, and the bearings 19A, 19B and the bearings 34A, 34B which radially support the axially inner ends of the pinion shafts 230. The bearings 33A, 33B, the bearings 19A, 19B, and the bearings 34A, 34B are disposed axially outward of the planetary gears 22A, 22B, and a bearing which radially supports the planetary carriers 23A, 23B on the case 11 is not provided axially inward of the planetary gears 22A, 22B, thus axial displacement of the planetary carriers 23A, 23B can be prevented, and respective spaces can be ensured axially inward of the planetary gears 22A, 22B.

Because the bearings 19A, 19B and the bearings 34A, 34B radially support the cylindrical shafts 16A, 16B which rotate integrally with the sun gears 21A, 21B, and also support the axially inner ends of the pinion shafts 230 via the cylindrical shafts 16A, 16B, the planetary carriers 23A, 23B and the cylindrical shafts 16A, 16B can be supported by the same the bearing, and thus the number of components can be decreased, and the supporting structure for the planetary gear speed reducers 12A, 12B can be reduced in size.

The cylindrical shafts 16A, 16B are provided with the extending portions 13A, 13B which extend inwardly of the sun gears 21A, 21B in the shaft direction of the pinion shafts 230, and the bearings 19A, 19B and the bearings 34A, 34B support the axially inner ends of the pinion shafts 230 via the extending portions 13A, 13B, respectively. Thus the planetary carriers 23A, 23B can be stably supported by extending the axial width of the cylindrical shafts 16A, 16B which rotate integrally with the sun gears 21A, 21B, respectively.

The planetary gears 22A, 22B are each double pinion gear, in which the major-diameter first pinions 26A, 26B, and the minor-diameter second pinions 27A, 27B are provided side-by-side in the axis direction, the sun gears 21A, 21B respectively engage with the first pinions 26A, 26B, the ring gears 24A, 24B respectively engage with the second pinions 27A, 27B, and the extending portions 13A, 13B and the second pinions 27A, 27B overlap with each other in the axis direction. Thus arrangement of the extending portions 13A, 13B in dead spaces of the double pinion gears can reduce the size of the planetary gears 22A, 22B in the axis direction.

Because the ring gears 24A, 24B are radially supported by the bearings 19A, 19B and the bearings 34A, 34B via the planetary carriers 23A, 23B, the case 11 does not need to be provided with a bearing for supporting the ring gears 24A, 24B separately.

The case 11 is provided with the partition walls 18A, 18B which radially extend axially outward from the planetary gears 22A, 22B, the partition walls 18A, 18B are provided with the bearings 33A, 33B and the bearings 34A, 34B, and thus only a single wall portion can support the bearings 33A, 33B and the bearings 34A, 34B, and therefore compared with the case where another wall portion is formed, the supporting structure for the planetary gear speed reducers 12A, 12B can be reduced in size.

The planetary gear speed reducers 12A, 12B are disposed as a driving source of the vehicle 3 along the power transmission path between the first and second electric motors 2A, 2B, and the rear wheels Wr, and the cylindrical shafts 16A, 16B which respectively connect the first and second electric motors 2A, 2B to the planetary gear speed reducers 12A, 12B, and the axles 10A, 10B which respectively connect the planetary gear speed reducers 12A, 12B to the rear wheels Wr are provided. The cylindrical shafts 16A, 16B each have a hollow structure, and the axles 10A, 10B are inserted into the inside of the cylindrical shafts 16A, 16B, respectively. The first electric motor 2A and the left rear wheel LWr are disposed axially outward of the planetary gear speed reducer 12A, the second electric motor 2B and the right rear wheel RWr are disposed axially outward of the planetary gear speed reducer 12B, and thus two power transmission shafts, i.e., the axles 10A, 10B and the cylindrical shafts 16A, 16B can be disposed on the same axis, and the radial size can be reduced. In addition, the planetary gear speed reducers 12A, 12B can be adjacently arranged between the first and second electric motors 2A, 2B, thus the size in the axis direction can be reduced.

The case 11 is provided with the bearings 20A, 20B which radially support the axles 10A, 10B, the bearings 20A, 20B are disposed axially outward of the planetary gears 22A, 22B, and the case 11 is not provided with a bearing which supports the axles 10A, 10B axially inward of the planetary gears 22A, 22B. Thus, in addition to the bearings which support the planetary carriers 23A, 23B, the bearings which support the axles 10A, 10B are also disposed together axially outward of the planetary gears 22A, 22B, and consequently respective spaces can be ensured axially inward of the planetary gears 22A, 22B.

The one-way clutch 50 is connected to the ring gears 24A, 24B, and is disposed axially inward of the planetary gears 22A, 22B, and specifically can be disposed in the neighborhood of the rotation shaft which is axially inward of the planetary gears 22A, 22B. Therefore, the radial size can be reduced. It should be noted that the hydraulic brake 60 may be disposed instead of the one-way clutch 50. Furthermore, the sun gears 21A, 21B may be each provided with the one-way clutch 50 or the hydraulic brake 60, and the ring gears 24A, 24B may be provided with the first and second electric motors 2A, 2B, respectively.

The planetary gear mechanism includes the planetary gear speed reducers 12A, 12B which are adjacently disposed with mirror symmetry, and the case 11 is not provided with a bearing between the planetary gear speed reducers 12A, 12B, the bearing radially supporting the respective planetary carrier 23A, 23B. Therefore, two spaces are formed on the side opposite to the side of the planetary gear speed reducers 12A, 12B where the bearings 19A, 19B, the bearings 33A, 33B, and the bearings 34A, 34B are arranged, and thus a large space can be ensured.

A first aspect of the present disclosure is a supporting structure for a planetary gear mechanism (for example, the first and second planetary gear speed reducers 12A, 12B in the embodiment) which is disposed in a case (for example, the case 11 in the embodiment) and includes a sun gear (for example, the sun gears 21A, 21B in the embodiment), a ring gear (for example, the ring gears 24A, 24B in the embodiment), and a planetary carrier (for example, the planetary carriers 23A, 23B in the embodiment) on a same axis, the planetary carrier rotatably supporting a plurality of planetary gears (for example, the planetary gears 22A, 22B in the embodiment) that are engaged with the sun gear and the ring gear, wherein the planetary carrier extends in an axis direction, and includes a rotation shaft (for example, the pinion shaft 230 in the embodiment) which rotatably supports the planetary gear, and an arm portion (for example, the inner arm portion 231 and an outer arm portion 232 in the embodiment) which radially extends and holds the rotation shaft, the planetary carrier is radially supported on the case by a first bearing (for example, the bearings 33A, 33B in the embodiment) which radially supports one end of the rotation shaft, and a second bearing (for example, the bearings 19A, 19B, 34A, and 34B in the embodiment) which radially supports other end of the rotation shaft, the first and second bearings are disposed on one side (for example, the axially outward in the embodiment) of the planetary gear in the axis direction, and a bearing which radially supports the planetary carrier on the case is not provided on other side (for example, the axially inward in the embodiment) of the planetary gear in the axis direction. Thus, the first and second bearings which support both ends of the planetary carrier are disposed together on one side of the planetary gear, and therefore, axial displacement of the planetary carrier can be prevented, and a space can be ensured on the other side of the planetary gear.

In addition to the configuration according to the first aspect of the present disclosure, a second aspect thereof is that the second bearing radially supports another rotation shaft (for example, the cylindrical shafts 16A, 16B in the embodiment) which rotates integrally with the sun gear, and supports other end of the rotation shaft via the another rotation shaft. Thus, the second bearing supports the other end of the rotation shaft via the another rotation shaft which rotates integrally with the sun gear, and therefore, the planetary carrier and the another rotation shaft can be supported by the same the bearing, the number of components can be decreased, and the supporting structure of a planetary gear mechanism can be reduced in size.

In addition to the configuration according to the second aspect of the present disclosure, a third aspect thereof is that the another rotation shaft includes an extending portion (for example, the extending portions 13A, 13B in the embodiment) which extends beyond the sun gear toward the other end of the rotation shaft, and the second bearing radially supports the other end of the rotation shaft via the extending portion. Thus, the planetary carrier can be stably supported by extending the axial width of the another rotation shaft which rotates integrally with the sun gear.

In addition to the configuration according to the third aspect of the present disclosure, a fourth aspect thereof is that the planetary gear is a double pinion gear in which a major-diameter gear (for example, the first pinions 26A, 26B in the embodiment) and a minor-diameter gear (for example, the second pinions 27A, 27B in the embodiment) are provided side-by-side, the sun gear is engaged with the major-diameter gear, the ring gear is engaged with the minor-diameter gear, and the extending portion and the minor-diameter gear overlap with each other in the axis direction. Thus, arrangement of the extending portion in dead space of the double pinion gear can reduce the size of the planetary gear in the axis direction.

In addition to the configuration according to the second aspect of the present disclosure, a fifth aspect thereof is that the ring gear is radially supported on the second bearing via the planetary carrier. Thus, the case does not need to be provided with a bearing for supporting the ring gear separately.

In addition to the configuration according to the first aspect of the present disclosure, a sixth aspect thereof is that the case includes a wall portion (for example, the partition walls 18A, 18B in the embodiment) which extends toward the one side of the planetary gear, and the wall portion is provided with the first and second bearings. Thus, only a single wall portion can support the first and second bearings, and therefore compared with the case where another wall portion is formed, the supporting structure for a planetary gear mechanism can be reduced in size.

In addition to the configuration according to the first aspect of the present disclosure, a seventh aspect thereof is that the planetary gear mechanism is disposed on a power transmission path between a driving source (for example, the first and second electric motors 2A, 2B in the embodiment) of a vehicle and a wheel (for example, the left rear wheel LWr, a right rear wheel RWr in the embodiment), and includes one power transmission shaft (for example, the cylindrical shafts 16A, 16B in the embodiment) which connects the driving source to the planetary gear mechanism and other power transmission shaft (for example, the axles 10A, 10B in the embodiment) which connects the planetary gear mechanism to the wheel, the one power transmission shaft has a hollow structure, the other power transmission shaft is inserted into the inside of the one power transmission shaft, and the driving source and the wheel are disposed on one side of the planetary gear mechanism in the axis direction. Thus, two power transmission shafts can be disposed on the same axis, and the radial size can be reduced. In addition, by disposing the driving source and the wheel together on one side of the planetary gear mechanism, the size in the axis direction can be reduced.

In addition to the configuration according to the seventh aspect of the present disclosure, an eighth aspect thereof is that the case includes a third bearing (for example, the bearings 20A, 20B in the embodiment) which radially supports the other power transmission shaft, the third bearing is disposed on the one side of the planetary gear in the axis direction, and the case is not provided with a bearing on the other side of the planetary gear, the bearing radially supporting the other power transmission shaft. Thus, in addition to the bearing which supports the planetary carrier, the third bearing which supports the other power transmission shaft is also disposed together on the one side of the planetary gear, and consequently a space can be ensured on the other side of the planetary gear.

In addition to the configuration according to the first aspect of the present disclosure, a ninth aspect thereof is that either one of the sun gear, the planetary carrier, and the ring gear of the planetary gear mechanism is connected to a one-way power transmission device (for example, the one-way clutch 50 in the embodiment) or a power connection/disconnection device (for example, the hydraulic brake 60 in the embodiment), and the one-way power transmission device or the power connection/disconnection device is disposed on the other side of the planetary gear in the axis direction. Thus, the one-way power transmission device or the power connection/disconnection device can be disposed in the neighborhood on the other side of the planetary gear, and therefore, the radial size can be reduced.

In addition to the configuration according to the first aspect of the present disclosure, a tenth aspect thereof is that the planetary gear mechanism includes two planetary gear mechanisms which are adjacently disposed with mirror symmetry, and the case is not provided with a bearing which radially supports respective planetary carriers between the two planetary gear mechanisms. Thus, two spaces are formed on the side opposite to the side where the first and second bearings are arranged, and thus a large space can be ensured.

The present disclosure is not limited to the above-described embodiment, and may be modified or improved as needed. Any configuration may be adopted as long as the configuration allows a planetary gear mechanism to be disposed along the power transmission path between the driving source of the vehicle and the wheels. For example, the driving source may be an engine instead of an electric motor, and may be incorporated in a front-wheel drive device.

Obviously, numerous modifications and variations of the present invention are possible in light of the above teachings. It is therefore to be understood that within the scope of the appended claims, the invention may be practiced otherwise than as specifically described herein.

What is claimed is:

1. A supporting structure for a planetary gear mechanism, comprising:
    a planetary carrier comprising:
        a rotation shaft extending in an axis direction to support a planetary gear of the planetary gear mechanism to be rotatable about a rotational axis along the axis direction, the rotation shaft including a first end and a second end opposite to the first end along the rotational axis; and
        an arm portion radially extending and holding the rotation shaft;
    a first bearing radially supporting the first end of the rotation shaft; and
    a second bearing radially supporting the second end of the rotation shaft, the first and second bearings being disposed on a first side of the planetary gear in the axis direction and radially supporting the planetary carrier to be rotatable in a casing in which the planetary gear mechanism is disposed, the planetary carrier being radially supported by the first and second bearings on partition walls without any of the first and second bearings being disposed on a second side of the planetary gear in the axis direction and that provides radial support on the casing for the planetary carrier, the second side being opposite to the first side with respect to the planetary gear in the axis direction.

2. The supporting structure for a planetary gear mechanism according to claim 1,
    wherein the second bearing radially supports a driving rotation shaft rotatable integrally with a sun gear of the planetary gear mechanism, and supports the second end of the rotation shaft via the driving rotation shaft.

3. The supporting structure for a planetary gear mechanism according to claim 2,
wherein the driving rotation shaft includes an extending portion which extends beyond the sun gear toward the second end of the rotation shaft, and
wherein the second bearing radially supports the second end of the rotation shaft via the extending portion.

4. The supporting structure for a planetary gear mechanism according to claim 3,
wherein the planetary gear includes a major-diameter gear and a minor-diameter gear that are provided side-by-side in the axis direction, the major-diameter gear having an outer diameter larger than an outer diameter of the minor-diameter gear,
wherein the sun gear is engaged with the major-diameter gear,
wherein a ring gear of the planetary gear mechanism is engaged with the minor-diameter gear, and
wherein the extending portion and the minor-diameter gear overlap with each other in the axis direction.

5. The supporting structure for a planetary gear mechanism according to claim 2,
wherein a ring gear of the planetary gear mechanism is radially supported on the second bearing via the planetary carrier.

6. The supporting structure for a planetary gear mechanism according to claim 1,
wherein the casing includes a wall portion which extends toward the first side of the planetary gear, and
wherein the wall portion is provided with the first and second bearings.

7. The supporting structure for a planetary gear mechanism according to claim 1,
wherein the planetary gear mechanism is disposed on a power transmission path between a driving source of a vehicle and a wheel, and includes a first power transmission shaft which connects the driving source to the planetary gear mechanism and a second power transmission shaft which connects the planetary gear mechanism to the wheel,
wherein the first power transmission shaft has a hollow structure,
wherein the second power transmission shaft is provided inside the first power transmission shaft, and
wherein the driving source and the wheel are disposed on one side of the planetary gear mechanism in the axis direction.

8. The supporting structure for a planetary gear mechanism according to claim 7, further comprising:
a third bearing radially supporting the second power transmission shaft and disposed on the first side of the planetary gear in the axis direction,
wherein the second power transmission shaft is radially supported by the third bearing without a bearing which radially supports the second power transmission shaft in the casing and which is provided on the second side of the planetary gear.

9. The supporting structure for a planetary gear mechanism according to claim 1,
wherein one of a sun gear, the planetary carrier, and a ring gear of the planetary gear mechanism is connected to one of a one-way power transmission device and a power connection/disconnection device, and
wherein one of the one-way power transmission device and the power connection/disconnection device is disposed on the second side of the planetary gear in the axis direction.

10. The supporting structure for a planetary gear mechanism according to claim 1,
wherein the planetary gear mechanism includes first and second planetary gear mechanisms which are adjacently disposed with mirror symmetry, the first planetary gear mechanism including the planetary carrier as a first planetary carrier, the second planetary gear mechanism including a second planetary carrier, and
wherein the first and second planetary carriers are radially supported by bearings including the first and second bearings without a bearing which radially supports one of the first and second planetary carriers and which is provided between the first and second planetary gear mechanisms in the axis direction.

11. The supporting structure for a planetary gear mechanism according to claim 1, further comprising:
a sun gear engaged with the planetary gear;
a driving rotation shaft rotatable integrally with the sun gear and supported by the second bearing to be rotatable relative to the casing; and
a fourth bearing provided between the planetary carrier and the driving rotation shaft and supporting the planetary carrier and the driving rotation shaft to be rotatable relative to each other.

12. The supporting structure for a planetary gear mechanism according to claim 11,
wherein the planetary carrier further comprises a carrier base portion extending from a radially inner end of the arm portion in the axis direction,
wherein the driving rotation shaft includes an extending portion extending in the axis direction and provided radially inward of the carrier base portion, and
wherein the fourth bearing is provided between the carrier base portion and the extending portion.

13. The supporting structure for a planetary gear mechanism according to claim 12,
wherein the arm portion includes a first arm portion and a second arm portion,
wherein the first arm portion radially supports the first end of the rotation shaft,
wherein the second arm portion radially supports the second end of the rotation shaft and is spaced apart from the first arm portion in the axis direction, and
wherein the carrier base portion is fixed to a radially inner portion of the second arm portion and extends from the radially inner portion of the second arm portion toward the first arm portion in the axis direction.

14. The supporting structure for a planetary gear mechanism according to claim 13,
wherein the fourth bearing is provided between the first and second arm portions in the axis direction.

* * * * *